United States Patent
Lumbab et al.

(10) Patent No.: US 9,938,852 B2
(45) Date of Patent: Apr. 10, 2018

(54) NOISE ATTENUATING LIPSKIN ASSEMBLY AND METHODS OF ASSEMBLING THE SAME

(71) Applicant: The Boeing Company, Seal Beach, CA (US)

(72) Inventors: Alex C. Lumbab, Bothell, WA (US); Justin Honshune Lan, Bothell, WA (US); Bradley Scott Leisten, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 467 days.

(21) Appl. No.: 14/266,303

(22) Filed: Apr. 30, 2014

(65) Prior Publication Data

US 2016/0024963 A1  Jan. 28, 2016

(51) Int. Cl.
*F03D 11/00* (2006.01)
*F01D 25/04* (2006.01)
(Continued)

(52) U.S. Cl.
CPC ............ *F01D 25/04* (2013.01); *B64D 33/02* (2013.01); *E04B 1/8209* (2013.01); *F01D 25/24* (2013.01);
(Continued)

(58) Field of Classification Search
CPC ........ B64D 29/02; B64D 29/04; B64D 33/02; E04B 1/8209; F01D 25/04; F01D 25/24; F02C 7/045; F05D 2220/36; F05D 2250/283; F05D 2260/96; F05D 2300/10; F05D 2300/6012
See application file for complete search history.

(56) References Cited

U.S. PATENT DOCUMENTS

| 3,806,928 A | 4/1974 | Costanza |
| 4,539,244 A | 9/1985 | Beggs et al. |

(Continued)

FOREIGN PATENT DOCUMENTS

| EP | 0911803 A2 | 4/1999 |
| EP | 2241504 A2 | 10/2010 |

(Continued)

OTHER PUBLICATIONS

GB Search and Examination Report, dated May 3, 2016, for copending GB patent application No. GB1506925.5 (6 pages).
(Continued)

*Primary Examiner* — Jesse Bogue
(74) *Attorney, Agent, or Firm* — Armstrong Teasdale LLP

(57) ABSTRACT

An acoustic assembly includes a backsheet including a plurality of perforations defined therethrough and an acoustic core coupled to the backsheet. The acoustic core includes a plurality of channels defined therethrough that are configured to be in flow communication with the plurality of perforations. The acoustic assembly also includes a linear facesheet coupled to the acoustic core, wherein the linear facesheet includes a plurality of apertures configured to be in flow communication with the plurality of channels. A lipskin is coupled to the linear facesheet, wherein the lipskin includes a plurality of openings configured to be in flow communication with the plurality of apertures.

20 Claims, 4 Drawing Sheets

(51) Int. Cl.
*B64D 33/02* (2006.01)
*F02C 7/045* (2006.01)
*E04B 1/82* (2006.01)
*F01D 25/24* (2006.01)

(52) U.S. Cl.
CPC ...... *F02C 7/045* (2013.01); *B64D 2033/0206* (2013.01); *F05D 2220/36* (2013.01); *F05D 2250/283* (2013.01); *F05D 2260/96* (2013.01); *F05D 2300/10* (2013.01); *F05D 2300/6012* (2013.01)

(56) References Cited

U.S. PATENT DOCUMENTS

| | | | |
|---|---|---|---|
| 4,738,416 A * | 4/1988 | Birbragher | B64D 15/04 244/134 B |
| 5,041,323 A | 8/1991 | Rose et al. | |
| 5,156,362 A | 10/1992 | Leon | |
| 5,344,280 A | 9/1994 | Langenbrunner et al. | |
| 5,653,836 A * | 8/1997 | Mnich | B29C 73/02 156/98 |
| 6,203,656 B1 | 3/2001 | Syed | |
| 6,268,038 B1 | 7/2001 | Porte et al. | |
| 6,371,242 B1 * | 4/2002 | Wilson | B32B 3/12 181/210 |
| 6,536,556 B2 | 3/2003 | Porte et al. | |
| 6,607,625 B2 | 8/2003 | Andre et al. | |
| 6,615,950 B2 | 9/2003 | Porte et al. | |
| 6,688,558 B2 | 2/2004 | Breer et al. | |
| 6,749,704 B2 | 6/2004 | Boussu et al. | |
| 6,755,280 B2 | 6/2004 | Porte et al. | |
| 6,761,245 B2 | 7/2004 | Porte | |
| 6,772,857 B2 | 8/2004 | Porte et al. | |
| 6,820,337 B2 | 11/2004 | Buge et al. | |
| 6,840,349 B2 * | 1/2005 | Andre | G10K 11/172 181/290 |
| 6,896,099 B2 | 5/2005 | Porte et al. | |
| 6,923,931 B2 | 8/2005 | Dublineau et al. | |
| 7,257,894 B2 | 8/2007 | Buge et al. | |
| 7,338,696 B2 | 3/2008 | Rambaud et al. | |
| 7,484,592 B2 | 2/2009 | Porte et al. | |
| 7,503,425 B2 | 3/2009 | Strunk | |
| 7,780,117 B2 * | 8/2010 | Botura | B64D 15/14 244/134 D |
| 7,790,082 B2 | 9/2010 | Buge et al. | |
| 7,857,093 B2 | 12/2010 | Sternberger et al. | |
| 7,921,966 B2 | 4/2011 | Chiou et al. | |
| 7,923,668 B2 | 4/2011 | Layland et al. | |
| 8,067,097 B2 | 11/2011 | Mueller | |
| 8,181,900 B2 * | 5/2012 | Chene | B64D 33/02 244/1 N |
| 8,240,982 B2 * | 8/2012 | Vauchel | B64D 15/12 415/119 |
| 8,740,137 B2 | 6/2014 | Vauchel et al. | |
| 8,863,893 B2 | 10/2014 | Sternberger et al. | |
| 8,899,512 B2 | 12/2014 | Vauchel et al. | |
| 8,919,494 B2 | 12/2014 | Burkett et al. | |
| 9,027,884 B2 * | 5/2015 | Valleroy | B64D 33/02 244/134 D |
| 2002/0157764 A1 | 10/2002 | Andre et al. | |
| 2003/0021976 A1 | 1/2003 | Dublineau et al. | |
| 2003/0042657 A1 | 3/2003 | Dublineau et al. | |
| 2004/0023026 A1 | 2/2004 | Rambaud et al. | |
| 2004/0006577 A1 | 4/2004 | Buge et al. | |
| 2004/0148891 A1 * | 8/2004 | Porte | G10K 11/168 52/506.01 |
| 2004/0227276 A1 | 11/2004 | Buge et al. | |
| 2004/0237502 A1 | 12/2004 | Moe et al. | |
| 2005/0006529 A1 * | 1/2005 | Moe | B64D 15/12 244/134 D |
| 2005/0081992 A1 | 4/2005 | Buge et al. | |
| 2005/0082112 A1 | 4/2005 | Harrison | |
| 2005/0254955 A1 | 11/2005 | Helder et al. | |
| 2006/0145001 A1 | 7/2006 | Smith | |
| 2006/0219475 A1 * | 10/2006 | Olsen | B64D 33/02 181/214 |
| 2007/0210073 A1 * | 9/2007 | Hubert | B64D 15/12 219/535 |
| 2008/0179448 A1 * | 7/2008 | Layland | B64D 15/12 244/1 N |
| 2008/0248278 A1 | 10/2008 | Fisher et al. | |
| 2009/0140104 A1 | 6/2009 | Surply et al. | |
| 2010/0084507 A1 | 4/2010 | Vauchel et al. | |
| 2010/0176250 A1 | 7/2010 | Porte | |
| 2010/0199629 A1 | 8/2010 | Chene et al. | |
| 2010/0252689 A1 | 10/2010 | Vauchel et al. | |
| 2010/0260602 A1 | 10/2010 | Binks et al. | |
| 2011/0142615 A1 | 6/2011 | Riou et al. | |
| 2011/0147534 A1 | 6/2011 | Chelin et al. | |
| 2011/0162429 A1 | 7/2011 | Leacock et al. | |
| 2011/0248117 A1 | 10/2011 | Boock et al. | |
| 2013/0126265 A1 | 5/2013 | Sternberger et al. | |
| 2013/0283821 A1 | 10/2013 | Gilson et al. | |
| 2015/0129045 A1 | 5/2015 | Kane et al. | |

FOREIGN PATENT DOCUMENTS

| | | |
|---|---|---|
| GB | 1490923 A | 11/1977 |
| GB | 2273131 A | 6/1994 |
| WO | 2012116999 A1 | 9/2012 |
| WO | 2014170609 A1 | 10/2014 |

OTHER PUBLICATIONS

Combined Search and Examination Report, dated Oct. 26, 2015, for co-pending patent application No. GB1506925.5 (5pgs.).
HexWeb Acousti-Cap product information, retrieved on Feb. 19, 2014 from website http://www.hexcel.com/Resources/DataSheets/Brochure-Data-Sheets/HexWeb_Acousti-Cap.pdf (4pgs.).
Greal Britain Office Action for Application No. GB16116303, dated Sep. 28, 2016, 4 pages.
Great Britain Search and Examination Report dated Jul. 26, 2016 for related application GB1611630.3; 7 pages.
Search Report for Application No. GB1503044.8, dated Jul. 17, 2015, 3 pages.
GB Combined Search and Examination Report, dated Jul. 26, 2016 for related application GB1611630.3; 7 pp.

* cited by examiner

NOISE ATTENUATING LIPSKIN ASSEMBLY AND METHODS OF ASSEMBLING THE SAME

BACKGROUND

The field of the disclosure relates generally to noise attenuation, and, more particularly, to a noise attenuating lipskin assembly and methods of assembling the same.

At least some known engines, such as some known jet engines and turbofan jet engines, are surrounded by a generally barrel-shaped nacelle. At least some known nacelles include a lipskin assembly at an inlet of the nacelle that at least partially defines a plenum configured to receive heated air for transpiring through the lipskin assembly to reduce ice formation on the nacelle. As such, at least some known lipskin assemblies provide structural strength, noise attenuation, and ice prevention measures for the nacelle. In one example, such as U.S. Pat. No. 6,688,558, the entirety of which is hereby incorporated herein by reference, at least one known lipskin assembly includes a perforated backsheet, a honeycomb core coupled to a forward side of the backsheet, and a perforated lipskin coupled to a forward side of the core. Heated air flows through the perforated backsheet, into the core, and transpires through the perforated lipskin to prevent ice from forming on the nacelle. Furthermore, sound waves generated inside the engine propagate forward and enter the cells of the honeycomb core through the lipskin and reflect from the backsheet at a phase different from the entering sound waves to facilitate damping the incoming sound waves and attenuating the overall noise level.

Moreover, at least some known lipskin assemblies include a nearly linear lipskin, that is, a material that responds substantially the same to acoustic waves regardless of the sound pressure (i.e., amplitude) of the waves, to facilitate noise attenuation. For example, in at least some known lipskin assemblies, the lipskin is uniformly covered with perforations that each have a diameter on the order of a few hundredths of an inch. Typically, the perforations are arranged such that the lipskin has a porosity of from 3 to 10 percent open area. The linearity of the lipskin increases with the density of such perforations. However, the linearity, and thus the acoustic performance, of at least some known lipskins is limited because a cost and a time required to form more of the small perforations with a necessary precision is prohibitive.

BRIEF DESCRIPTION

In one aspect, an acoustic assembly is provided. The acoustic assembly includes a backsheet including a plurality of perforations defined therethrough and an acoustic core coupled to the backsheet. The acoustic core includes a plurality of channels defined therethrough that are configured to be in flow communication with the plurality of perforations. The acoustic assembly also includes a linear facesheet coupled to the acoustic core, wherein the linear facesheet includes a plurality of apertures configured to be in flow communication with the plurality of channels. A lipskin is coupled to the linear facesheet, wherein the lipskin includes a plurality of openings configured to be in flow communication with the plurality of apertures.

In another aspect, a jet engine nacelle including a lipskin assembly is provided. The lipskin assembly includes a backsheet including a plurality of perforations defined therethrough, wherein the backsheet forms an inner surface of the nacelle. An acoustic core is coupled to the backsheet, wherein the acoustic core includes a plurality of channels defined therethrough. The plurality of channels are configured to be in flow communication with the plurality of perforations. A linear facesheet including a plurality of apertures configured to be in flow communication with the plurality of channels is then coupled to the acoustic core. The lipskin assembly also includes a lipskin coupled to the linear facesheet. The lipskin includes a plurality of openings configured to be in flow communication with the plurality of apertures such that a flow of heated air transpires through the acoustic core, the linear facesheet, and the lipskin to prevent ice formation on an outer surface of the lipskin, wherein the lipskin forms an outer surface of the nacelle.

In another aspect, a method of assembling a transpiring lipskin assembly is provided. The method includes coupling an acoustic core to a backsheet having a plurality of perforations defined therethrough. The acoustic core includes a plurality of channels that are configured to be in flow communication with the plurality of perforations. The method also includes coupling a linear facesheet to the acoustic core, wherein the linear facesheet includes a plurality of apertures configured to be in flow communication with the plurality of channels. A lipskin is coupled to the linear facesheet, wherein the lipskin includes a plurality of openings configured to be in flow communication with the plurality of apertures such that a flow of heated air transpires through the acoustic core, the linear facesheet, and the lipskin to prevent ice formation on an outer surface of the lipskin.

DETAILED DESCRIPTION

Figure 1:
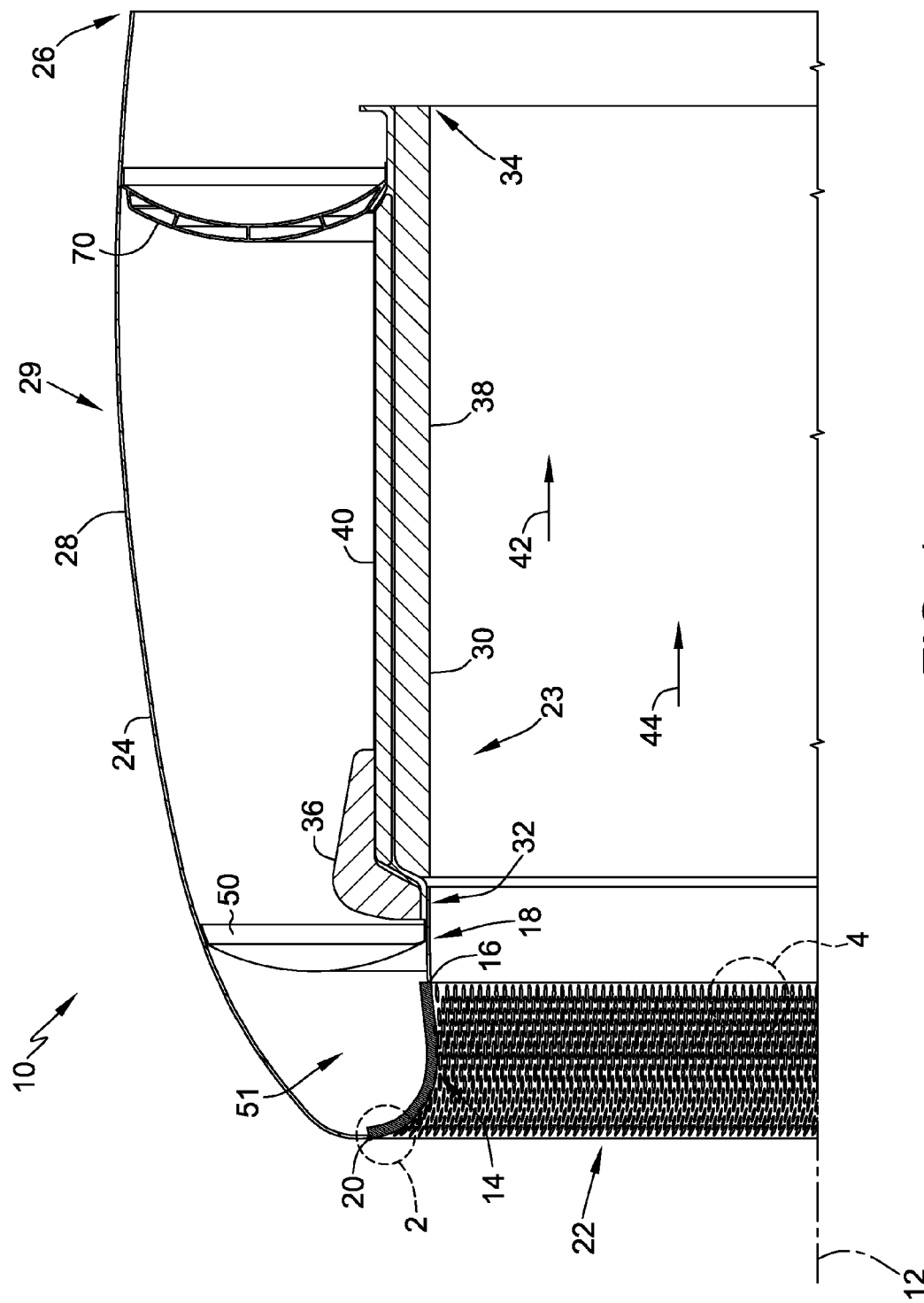
FIG. 1 is a schematic cross-sectional view of an embodiment of an engine nacelle.

The apparatus and methods described herein provide for a lightweight and efficient engine nacelle that attenuates noise promulgating from the engine while also providing increased structural rigidity. The engine nacelle includes a lipskin assembly comprising a lipskin that includes a first segment and a second segment that are coupled together at a location proximate to a hilite of the nacelle. The second segment extends sufficiently far downstream to reduce or eliminate a need for at least one closeout panel aft of the lipskin. In addition to separately formed first and second segments, the embodiments provide for superplastic, or alternatively non-superplastic, stretch-forming of the first and second segments to facilitate reducing or eliminating ripples and/or waves in the lipskin. As such, the lipskin described herein unexpectedly reduces or eliminates a premature transition from natural laminar air flow to turbulent air flow as compared to conventional lipskins.

Moroever, the lipskin assembly may include a linear facesheet coupled between an acoustic core and the lipskin. Each of the acoustic core, linear facesheet, and lipskin include a plurality of openings that facilitate channeling heated air therethrough to provide ice prevention measures on the nacelle. The openings in the linear facesheet form a plurality of tortuous paths that facilitate damping the noise generated by the engine within the nacelle. As such, the lipskin itself may not be relied upon to perform the full noise attenuation responsibilities of the lipskin assembly, which may allow for openings in the lipskin to be fewer in number and larger than those in other conventional lipskin. More specifically, the lipskin openings can be elongated in a direction of airflow to facilitate an increased percent open area of the lipskin while maintaining structural integrity of the lipskin and reducing excrescence drag. As such, the lipskin assembly facilitates an ease of manufacture of the nacelle by avoiding a time- and cost-intensive lipskin opening formation process.

Furthermore, the engine nacelle may provide for additional noise attenuation using a plurality of generally concentric cores. A thickness of a first of the plurality of cores is not equal to a thickness of a second of the plurality of cores, such that the second core complements a damping provided by first core. Because the first and second cores may not be relied upon to meet structural strength requirements of the nacelle, the cells in the first core generally may not be aligned with the cells in a second core, facilitating an ease of manufacture of the nacelle by avoiding a time- and cost-intensive cell alignment and/or cell-by-cell septumization process. In addition, the apparatus and methods described herein provide a core linear facesheet that is similar to the lipskin described above in that the core linear facesheet includes elongated orifices that facilitate an increased percent open area of the facesheet while maintaining structural integrity of the facesheet and reducing excrescence drag.

The structural rigidity of the nacelle may be provided by a forward bulkheads and an aft bulkhead. Each of the forward and aft bulkheads include a curvilinear body portion that extends from the second segment of the lipskin to one of the first segment of the lipskin or the plurality of cores. The body portions are curved in cross section such that they are able to receive an impact load, from a birdstrike, for example, and transfer that load circumferentially about the circumference of the nacelle. Furthermore, the curvilinear body portion of the aft bulkhead is configured to react to radial loads caused by a fan blade out event. As such, the exemplary engine nacelle eliminates the need for an additional crush zone component to react to the radial load. Moreover, the forward bulkhead is formed from a thermal insulating material such that independent insulating components are not required in the exemplary nacelle. Accordingly, the forward and aft bulkheads facilitate reducing the part count of the engine nacelle and provide for a lighter, less expensive, and more easily serviceable engine nacelle.

Used in combination, the features described above provide for a noise attenuating engine nacelle that is easier to manufacture, more fuel efficient, less expensive, more easily serviceable, and more lightweight than conventional engine nacelles. However, while a preferred implementation of the engine nacelle includes each of the features described above, it is contemplated that any one of such features provides for an improved engine nacelle as compared to known nacelles. As such, the exemplary engine nacelle described herein may have one, all, or any combination of the features described above.

Referring more particularly to the drawings, implementations of the disclosure may be described in the context of a nacelle 10 shown schematically in cross-section in FIG. 1. In an embodiment, nacelle 10 encloses a turbofan engine for use with an aircraft. It should be understood, however, that the disclosure applies equally to nacelles for other types of engines, as well as to other structures subjected to noise-generating fluid flow in other applications, including but not limited to automobiles, heavy work vehicles, and other vehicles.

In the illustrated implementation, nacelle 10 extends generally circumferentially about a centerline 12. A lipskin assembly 14 includes a first lipskin assembly segment 16 that extends from a first lipskin edge 18 to a hilite 20 to define a generally diffuser-shaped inlet 22 of nacelle 10. As such first assembly segment 16 is positioned on an interior 23 of nacelle 10.

Lipskin assembly 14 further includes a second assembly segment 24 that extends from hilite 20 to a second lipskin edge 26 to form at least a portion of a radially outer barrel 28 positioned on an exterior 29 of nacelle 10. A radially inner barrel 30 extends from a first inner barrel edge 32, proximate to first lipskin edge 18, to a second inner barrel edge 34. Inner barrel 30 includes a radially inner surface 38 and a generally concentric radially outer surface 40. Radially inner surface 38 is disposed proximate to an airflow 42 that enters through inlet 22 and flows generally in a downstream direction 44 when nacelle 10 is in an operational state.

In an embodiment, inner barrel 30 is coupled to lipskin assembly 14 through a plurality of circumferentially spaced gusseted brackets 36. More specifically, gusseted brackets 36 extend from first inner barrel edge 32 and are configured to couple to first lipskin edge 18. In alternative embodiments, inner barrel 30 and lipskin 14 are coupled in any suitable fashion that enables nacelle 10 to function as described herein.

A generally annular forward bulkhead 50 extends radially between first lipskin segment 16 and second lipskin segment 24 such that forward bulkhead 50 and a portion of lipskin assembly 14 form a D-duct plenum 51. In the exemplary implementation, plenum 51 is an annular plenum extending about nacelle 10 that is configured to channel a flow of heated air received by an ice prevention system (not shown). The heated air is configured to transpire through lipskin assembly 14 to prevent the formation of ice crystals on nacelle 10, as described in further detail below.

In the illustrated embodiment, forward bulkhead 50 extends from first lipskin segment 16 generally proximate to first lipskin edge 18. In addition, a generally annular aft bulkhead 70 extends radially between inner barrel 30 and second lipskin assembly segment 24. In the illustrated embodiment, aft bulkhead 70 extends from inner barrel 30 generally proximate to second inner barrel edge 34. In alternative embodiments, forward bulkhead 50 and aft bulkhead 70 are disposed in any suitable position that enables nacelle 10 to function as described herein.

Figure 2:
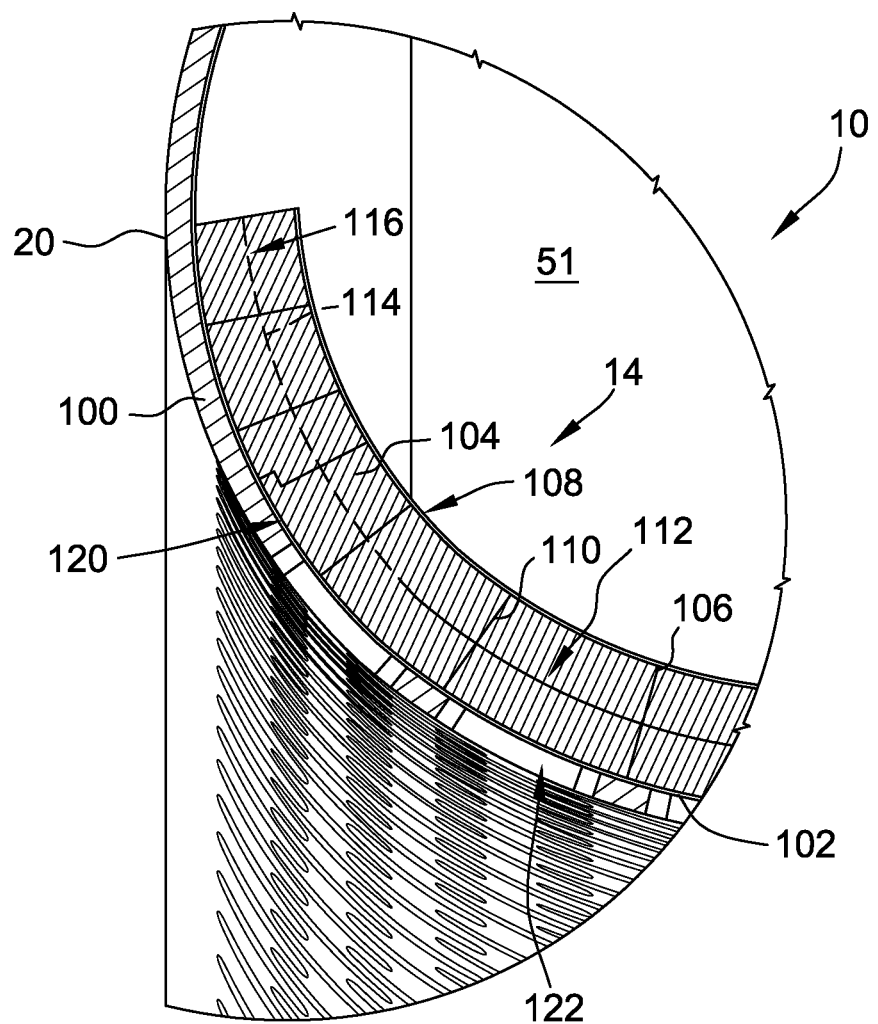
FIG. 2 is an enlarged cross-sectional view of a portion of the engine nacelle shown in FIG. 1 illustrating an exemplary noise attenuating lipskin assembly.

FIG. 2 is an enlarged cross-sectional view of a portion of engine nacelle 10 illustrating the exemplary noise attenuating lipskin assembly 14. Lipskin assembly 14 is configured to both channel heated air from within plenum 51 to the exterior of nacelle 10 to facilitate de-icing and to attenuate the noise level propagated from nacelle inlet 22. In the exemplary implementation, lipskin assembly 14 includes a lipskin 100, a linear facesheet 102 coupled to lipskin 100, an acoustic core 104 coupled to linear facesheet 102, and a backsheet 106 coupled to acoustic core 104 opposite linear facesheet 102. More specifically, lipskin 100 is configured to be the radially innermost layer of assembly 14, with respect to centerline 12, such that lipskin 100 is in contact with airflow 42 when nacelle 10 is in an operational state. Linear facesheet 102, acoustic core 104, and backsheet 106 are successively oriented such that backsheet 106 is the radially outmost layer of assembly 14. Alternatively, lipskin 100, linear facesheet 102, acoustic core 104, and backsheet 106 may be oriented in any order that facilitates operation of lipskin assembly 14 as described herein.

In the exemplary implementation, lipskin 100, linear facesheet 102, acoustic core 104, and backsheet 106 are formed from titanium. Alternatively, lipskin 100, linear facesheet 102, acoustic core 104, and backsheet 106 may be formed from aluminum. Generally, lipskin 100, linear facesheet 102, acoustic core 104, and backsheet 106 are formed from a material, preferably metallic, that is able to withstand temperatures of the heated air within plenum 51 within a range of between approximately 400° F. (204° C.) to approximately 1000° F. (537° C.). Accordingly, bleed air for ice prevention may be ducted directly from the jet turbine engine to plenum 51 for transpiration without first cooling the bleed air.

Furthermore, because of the temperature range to which lipskin assembly is subjected and also to minimize the potential for sonic fatigue, consideration is given as to how lipskin assembly is coupled together. In the exemplary embodiment, lipskin 100, linear facesheet 102, acoustic core 104, and backsheet 106 are coupled together using diffusion bonding. Alternatively, lipskin 100, linear facesheet 102, acoustic core 104, and backsheet 106 may be brazed or welded together, or in another embodiment, may be coupled together using an adhesive. Generally, lipskin 100, linear facesheet 102, acoustic core 104, and backsheet 106 may be coupled together in any suitable fashion that enables lipskin assembly 14 to function as described herein.

In the exemplary implementation, lipskin 100 extends between first lipskin edge 18 and second lipskin edge 26, while linear facesheet 102, acoustic core 104, and backsheet 106 extend between first lipskin edge 18 and hilite 20. Alternatively, linear facesheet 102, acoustic core 104, and backsheet 106 extend between first lipskin edge 18 and second lipskin edge 26. Lipskin assembly 14 includes a thickness that is substantially constant between first lipskin edge 18 and hilite 20. Such constant thickness is within a range of between approximately 0.5 inches (in.) (12.7 millimeter (mm.)) and approximately 4.0 in. (101.6 mm.). However, in alternative embodiments, lipskin assembly 14 may include a thickness that is varied or tapered between first lipskin edge 18 and hilite 20.

In the exemplary embodiment, backsheet 106 includes a plurality of perforations 108 therethough that are configured to allow heated air from plenum 51 to be channeled therethough into acoustic core 106. More specifically, perforations 108 comprise a predetermined percentage open area (POA) that enables a predetermined amount of heated air to flow therethrough. Perforations 108 of backsheet 106 make up a relatively low POA that limits the amount the heated air that is able to pass through to prevent overheating of acoustic core 104, linear facesheet 102, and lipskin 100. The amount of heated air through lipskin assembly 14 is controlled to minimize excessive flow out of lipskin 100 to prevent the heated air from causing a turbulent airflow to form at lipskin 100. As described above, backsheet 106 is made from a metallic material and includes a thickness in a range of between approximately 0.02 in. (0.508 mm.) and approximately 0.10 in. (2.54 mm.). In other embodiments, backsheet 106 is formed from any suitable material and has any suitable thickness that facilitates operation of lipskin assembly 14 as described herein.

Lipskin assembly 14 also includes acoustic core 104 coupled in a face-to-face relationship to backsheet 106. In the exemplary implementation, acoustic core 104 includes a plurality of cells 110 arranged in a honeycomb pattern wherein each cell 110 has a generally hexagonal cross-section and includes a channel 112 defined therethrough. Generally, cells 110 may be shaped and arranged in any suitable pattern that enables acoustic core 104 to function as described herein. The plurality of channels 112 are configured to be oriented in flow communication with the plurality of perforations 108 in backsheet 106 such that each cell channel 112 acts as a conduit to allow heated air to transpire from plenum 51 through backsheet 106 and acoustic core 104. Moreover, channels 112 are configured to attenuate the noise generated by the jet turbine engine. As such, acoustic core 104 may be septumized to create a Helmholtz resonator for improved acoustic attenuation.

In the exemplary implementation, acoustic core cells 110 are full-depth cells, that is, cells 110 are continuous through acoustic core 104 between backsheet 106 and linear facesheet 102. Alternatively, cells 110 may be split-core cells, that is, cells 110 may be split into a first portion coupled to backsheet 106 and a second portion coupled to linear facesheet 102. In such an embodiment, cells 110 of the first and second portions are one of aligned or offset. Moreover, acoustic core 104 may include an intermediate linear fabric material 114 (shown in broken lines) between backsheet 106 and linear facesheet 102, and more specifically, between the first and second portions of cells 110. Such an intermediate layer 114 also includes a plurality of holes 116 defined therethrough to enable heated air from plenum 51 to transpire through backsheet 106 and acoustic core 104. Furthermore, acoustic core 104 includes a thickness in a range of between approximately 0.5 in. (12.7 mm.) to approximately 2.5 in. (63.5 mm.). Generally, acoustic core 104 may have any thickness that facilitates operation of lipskin assembly 14 as described herein. More specifically, the thickness of acoustic core 104 may be tuned to provide optimum noise attenuation for various jet engine and nacelle configurations.

In order to further dissipate the noise generated by the jet turbine engine and emanating from nacelle inlet 22, lipskin assembly 14 includes acoustically linear facesheet 102 made from a linear material coupled between lipskin 100 and acoustic core 104. As used herein, the term "linear material" is meant to describe any material that responds substantially the same to acoustic waves regardless of the sound pressure (i.e., amplitude) of the waves, to facilitate noise attenuation. With a linear material, the pores or passages defined therein may be configured such that resistance to pressure waves does not vary with the noise level, and the pressure drop across the material is relatively constant with respect to the pressure wave velocity. This is a result of the pressure losses primarily due to viscous or friction losses through the material.

Figure 3:
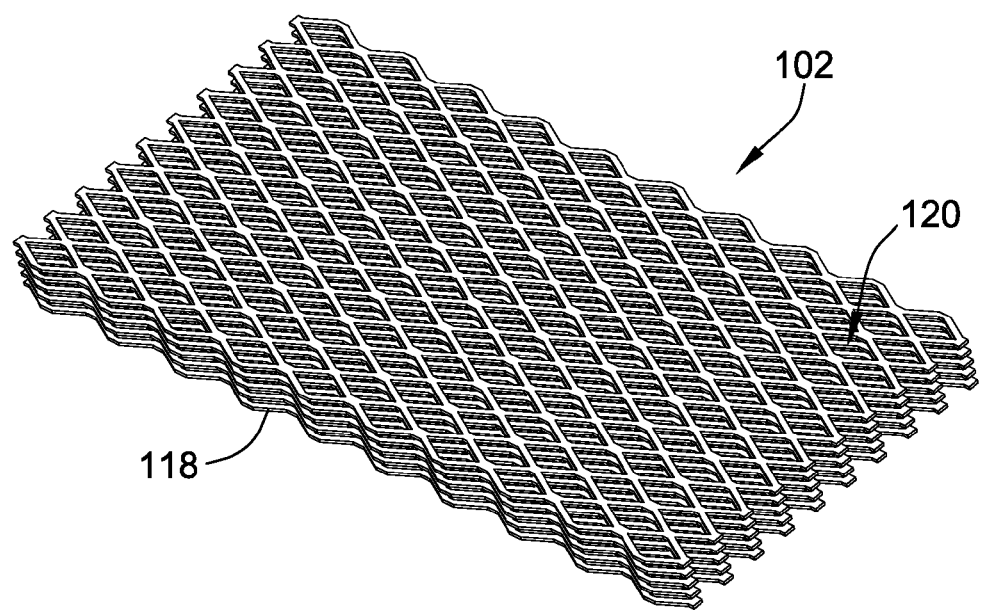
FIG. 3 is a perspective view of an exemplary linear facesheet that may be used with the lipskin assembly shown in FIG. 2.

In the exemplary implementation, linear facesheet 102 includes a plurality of sheets 118 of an expanded metal fabric coupled together to form linear facesheet 102 (as shown in FIG. 3). Alternatively, linear facesheet 102 may be made from one or more sheets of woven or non-woven wire mesh fabric or felt metal fabric. Generally, linear facesheet 102 may be made from any material that facilitates operation of lipskin assembly 14 as described herein. Linear facesheet 102 has an overall thickness in a range of between approximately 0.02 in. (0.508 mm.) and approximately 0.10 in.

(2.54 mm.), while each expanded metal sheet 118 has a thickness in a range of between approximately 0.002 in. (0.05 mm.) and approximately 0.01 in. (0.254 mm.). As described above, linear facesheet 102 is comprised of a metal able to withstand the relatively high heated air temperatures, such as, but not limited to, titanium, aluminum, or any combination thereof.

Linear facesheet 102 includes a plurality of apertures 120 therethough that are configured to be oriented in flow communication with the plurality of perforations 108 in backsheet 106 and the plurality of channels 112 in acoustic core 104 such that each aperture 120 acts as a conduit to allow heated air to transpire from plenum 51 through backsheet 106, acoustic core 104, and linear facesheet 102. In one preferred embodiment, sheets 118 are coupled together in a random orientation such that apertures 120 of one sheet 118 are not aligned with apertures 120 of an adjacent sheet 118. As such, apertures 120 form a tortuous path through linear facesheet 102 that presents an impedance to pressure sound waves and, therefore, facilitates noise attenuation. In one implementation, each of the plurality of apertures 120 in linear facesheet 102 is larger than each of the plurality of perforations 108 in backsheet 106. As such, the POA of linear facesheet 102 is higher than the POA of backsheet 106. Alternatively, linear face sheet 102 and backsheet 106 can have other configurations in which the porosity of facesheet 102 is less than that of backsheet 106. For example, apertures 120 can have the same size as perforations 108, but apertures 120 can be spaced closer together than perforations 108 to provide a higher porosity to facesheet 102 than backsheet 106.

Lipskin assembly 14 also includes lipskin 100 coupled in a face-to-face relationship to linear facesheet 102. In the preferred implementation, linear facesheet 102, acoustic core 104, and backsheet 106 extend from first lipskin edge 18 to hilite 20, and lipskin 100 extends between first lipskin edge 18, through hilite 20, to second lipskin edge 26. In the exemplary implementation, lipskin 100 includes a plurality of openings 122 defined therethrough The plurality of openings 122 are configured to be oriented in flow communication with the plurality of perforations 108 in backsheet 106, the plurality of channels 112 in acoustic core 104, and the plurality of apertures 120 in linear facesheet 102 such that each cell openings 122 acts as a conduit to allow heated air to transpire from plenum 51 through backsheet 106, acoustic core 104, and linear facesheet 102. Furthermore, lipskin 100 includes a thickness in a range of between approximately 0.05 in. (1.27 mm.) and approximately 0.10 in. (2.54 mm.). Generally, lipskin 100 may have any thickness that facilitates operation of lipskin assembly 14 as described herein.

Figure 4:
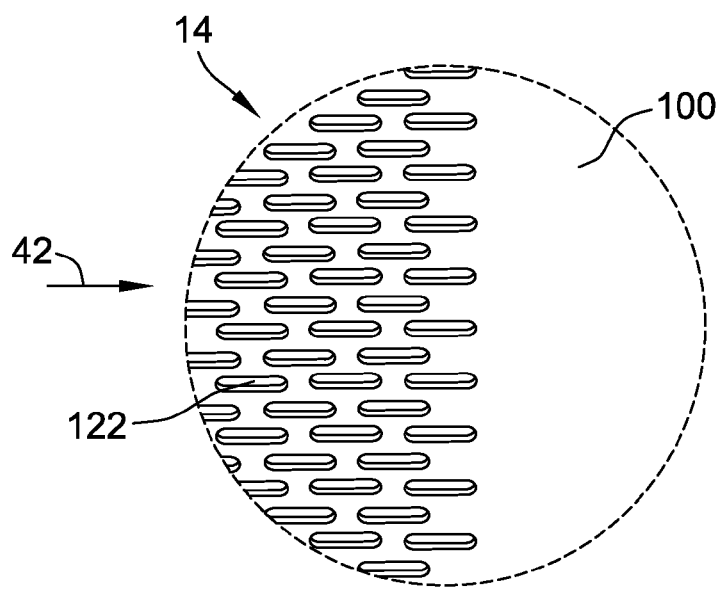
FIG. 4 is an enlarged cross-sectional view of a portion of the engine nacelle shown in FIG. 1 illustrating an exemplary slotted lipskin of the lipskin assembly.

As shown in FIG. 4, in the exemplary implementation, openings 122 are elongated in axial direction 44 such that openings 122 form slots aligned in the direction of airflow 42 to facilitate minimizing excrescence drag created by openings 122. Alternatively, openings 122 may have any shape, such as, but not limited to, circular or elliptical, that facilitates operation of lipskin assembly 14. In the exemplary implementation openings 122 are spaced on lipskin 100 such that lipskin 100 has a porosity in a range of between approximately 15 POA to approximately 30 POA. In an embodiment, openings 122 are spaced such that lipskin 100 has a porosity of approximately 25 POA. The relatively high porosity of lipskin 100 reduces the pressure loss through openings 122. Accordingly, the pressure within acoustic core 104 is approximately equal to the pressure along a surface of lipskin 100, and openings 122 do not significantly affect the flow of air into and out of acoustic core 104 as sound waves pass over surface of lipskin 100.

In at least some embodiments, a shape and spacing of openings 122 on lipskin 100 facilitate an increased linearity of, and acoustic attenuation by, lipskin assembly 14, as compared to at least some known lipskin assemblies. Moreover, a shape and spacing of openings 122 facilitates a structural integrity of lipskin 100 for a given porosity, while allowing linear facesheet 102 to perform the majority of the noise attenuation. A shape and spacing of openings 122 also facilitates a decreased cost and time required to manufacture lipskin 100. For example, in a particular embodiment, lipskin 100 is used as part of nacelle 10 (shown in FIG. 1) for a turbofan engine, and lipskin 100 includes about 96,000 openings 122, wherein millions of perforations are required for a known lipskin in a similar application.

Figure 5:
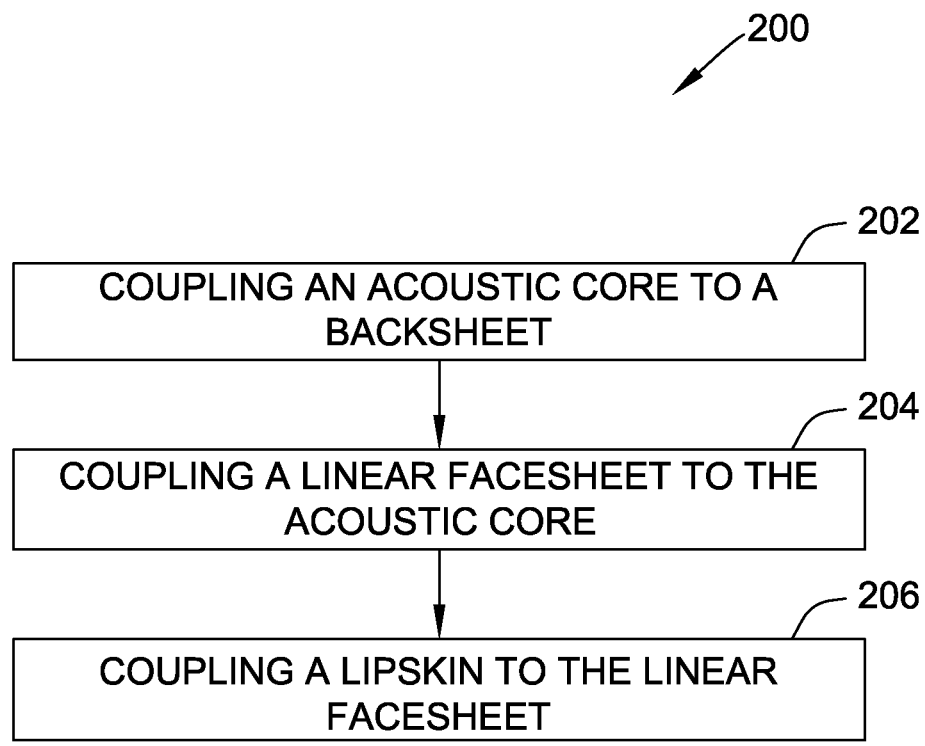
FIG. 5 is a flowchart of an embodiment of a method of assembling the lipskin assembly shown in FIG. 2.

FIG. 5 is a flowchart of an embodiment of a method 200 of assembling a lipskin assembly, such as lipskin assembly 14. Method 200 includes coupling 202 an acoustic core, such as acoustic core 104, to a backsheet, such as backsheet 106, wherein the includes plurality of perforations, such as perforations 108, defined therethrough. The acoustic core includes plurality of channels, such as plurality of channels 112, which are configured to be in flow communication with the plurality of backsheet perforations. A linear facesheet, such as linear facesheet 102, is coupled 204 to the acoustic core. Similar to the backsheet and acoustic core, the linear facesheet includes a plurality of apertures, such as apertures 120, configured to be in flow communication with the plurality of acoustic core channels and the plurality of backsheet perforations. Method 200 further includes coupling 206 a lipskin, such as lipskin 100, to the linear facesheet, wherein the lipskin includes a plurality of openings, such as openings 122, configured to be in flow communication with the plurality of linear facesheet apertures, the plurality of acoustic core channels, and the plurality of backsheet perforations such that a flow of heated air transpires through the acoustic core, the linear facesheet, and the lipskin to prevent ice formation on an outer surface of the lipskin.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide an apparatus and method for noise attenuation and ice prevention in an engine nacelle. The embodiments provide for a lipskin assembly that includes a linear facesheet coupled between an acoustic core and a lipskin. Each of the acoustic core, linear facesheet, and lipskin include a plurality of openings that facilitate channeling heated air therethrough to provide ice prevention measures on the nacelle. The openings formed in the linear facesheet form a plurality of tortuous paths that facilitate damping the noise generated by the engine within the nacelle such that the linear facesheet performs a majority of the noise attenuation of the lipskin assembly. Because the lipskin is not relied upon to perform the full noise attenuation responsibilities of the lipskin assembly, the openings in the lipskin may be fewer in number and larger than those in other known lipskin assemblies. The embodiments described herein provide improvements over at least some known noise attenuation systems for engine nacelles. As compared to at least some known noise attenuation systems, the embodiments described herein facilitate an ease of manufacture of the nacelle by avoiding a time- and cost-intensive lipskin opening formation process. In addition, the embodiments described herein facilitate an increased percent open area of the lipskin, and thus allowing for increased heated air transpiration, while maintaining structural integrity of the lipskin and reducing excrescence drag. Furthermore, the use of a linear facesheet that is independent from the lipskin provides for improved acoustic performance over a lipskin having discrete hole perforations.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acoustic assembly comprising:
a backsheet comprising a plurality of perforations defined therethrough;
an acoustic core coupled to said backsheet, said acoustic core comprising a plurality of channels defined therethrough, wherein said plurality of channels are configured to be in flow communication with said plurality of perforations;
a linear facesheet coupled to said acoustic core, said linear facesheet comprising a plurality of apertures configured to be in flow communication with said plurality of channels, wherein said linear facesheet comprises a plurality of sheets of material, and wherein each aperture of said plurality of apertures is larger than each perforation of said plurality of perforations; and
a lipskin coupled to said linear facesheet, wherein said linear facesheet is coupled in a face-to-face relationship between said lipskin and said acoustic core, said lipskin comprising a plurality of openings configured to be in flow communication with said plurality of apertures.

2. The acoustic assembly in accordance with claim 1, wherein said plurality of sheets of material of said linear facesheet comprises a plurality of sheets of at least one of an expanded metal fabric, a felt metal fabric, and a woven wire mesh fabric.

3. The acoustic assembly in accordance with claim 1, wherein said linear facesheet comprises a plurality of sheets of expanded metal fabric that each include a plurality of passages defined therethrough, wherein said plurality of sheets are oriented such that said plurality of passages form a plurality of tortuous paths defined between said acoustic core and said lipskin.

4. The acoustic assembly in accordance with claim 3, wherein each sheet of said plurality of sheets has a thickness in a range of between 0.002 inches and 0.01 inches.

5. The acoustic assembly in accordance with claim 1, wherein said backsheet comprises a single, monolithic sheet of material.

6. The acoustic assembly in accordance with claim 1, wherein each opening of said plurality of lipskin openings is elongated in a direction of an airflow over said lipskin.

7. The acoustic assembly in accordance with claim 1, wherein plurality of openings is arranged on said lipskin such that said lipskin has a porosity in a range of between 15 percent to 30 percent open area.

8. The acoustic assembly in accordance with claim 1, wherein said perforations in said backsheet, said channels in said acoustic core, said apertures in said linear facesheet, and said openings in said lipskin enable a flow of heated air to flow through each of said backsheet, said acoustic core, said linear facesheet, and said lipskin.

9. An engine nacelle comprising a lipskin assembly that at least partially defines a plenum, said lipskin assembly comprising:
a backsheet comprising a plurality of perforations defined therethrough, said backsheet forming an inner surface of said nacelle, wherein said backsheet is exposed to said plenum;
an acoustic core coupled to said backsheet, said acoustic core comprising a plurality of channels defined therethrough, wherein said plurality of channels are configured to be in flow communication with said plurality of perforations;
a linear facesheet coupled to said acoustic core, said linear facesheet comprising a plurality of apertures configured to be in flow communication with said plurality of channels material, and wherein each aperture of said plurality of apertures is larger than each perforation of said plurality of perforations; and
a lipskin coupled to said linear, wherein said linear facesheet is coupled in a face-to-face relationship between said lipskin and said acoustic core, said lipskin comprising a plurality of openings configured to be in flow communication with said plurality of apertures such that a flow of heated air transpires through said acoustic core, said linear facesheet, and said lipskin to prevent ice formation on an outer surface of said lipskin, said lipskin forming an outer surface of said nacelle.

10. The engine nacelle in accordance with claim 9, wherein said perforations in said backsheet are configured to channel bleed air from an interior of the plenum through the plurality of openings in the lipskin.

11. The engine nacelle in accordance with claim 9, wherein said linear facesheet comprises at least one sheet of an expanded metal fabric, a felt metal fabric, and a woven wire mesh fabric.

12. The engine nacelle in accordance with claim 9, wherein said linear facesheet comprises a plurality of sheets of expanded metal fabric that each include a plurality of passages defined therethrough, wherein said plurality of sheets are oriented such that said plurality of passages form a plurality of tortuous paths defined between said acoustic core and said lipskin.

13. The engine nacelle in accordance with claim 9, wherein said lipskin, said linear facesheet, said acoustic core, and said backsheet are sequentially layered to form said lipskin assembly.

14. The engine nacelle in accordance with claim 9, wherein plurality of openings is arranged on said lipskin such that said lipskin has a porosity in a range of between 15 percent to 30 percent open area.

15. A method of assembling a transpiring lipskin assembly, said method comprising:

coupling an acoustic core to a backsheet such that the backsheet is positioned in a face-to-face relationship between the core and a plenum defined by the lipskin assembly, the backsheet having a plurality of perforations defined therethrough, the acoustic core having a plurality of channels that are configured to be in flow communication with the plurality of perforations;

coupling a linear facesheet to the acoustic core, the linear facesheet having a plurality of apertures configured to be in flow communication with the plurality of channels material, wherein each aperture of said plurality of apertures is larger than each perforation of said plurality of perforations; and coupling a lipskin to the linear facesheet such that the linear facesheet is coupled in a face-to-face relationship between the lipskin and the acoustic core, the lipskin having a plurality of openings configured to be in flow communication with the plurality of apertures such that a flow of heated air transpires through the acoustic core, the linear facesheet, and the lipskin to prevent ice formation on an outer surface of the lipskin.

16. The method in accordance with claim 15, wherein the acoustic core is a split-cell core having a first portion and a second portion, said method further comprising coupling a linear fabric between the first and second portions.

17. The method in accordance with claim 15 further comprising forming the linear facesheet from at least one sheet of an expanded metal fabric, a felt metal fabric, and a woven wire mesh fabric.

18. The method in accordance with claim 17 further comprising forming the linear facesheet from a plurality of sheets of expanded metal fabric that each include a plurality of passages defined therethrough, wherein the plurality of sheets are oriented such that the plurality of passages form a plurality of tortuous paths defined between the acoustic core and the lipskin.

19. The engine nacelle in accordance with claim 10, wherein the flow of heated air is discharged from within the plenum, through said perforations in said backsheet, through said channels in said acoustic core, through said apertures in said linear facesheet, and through said openings in said lipskin such that a flow of heated air transpires through said acoustic core, said linear facesheet, and said lipskin to prevent ice formation on an outer surface of said lipskin, said lipskin forming an outer surface of said nacelle.

20. The method in accordance with claim 15, wherein coupling the lipskin to the linear facesheet further comprises coupling the lipskin wherein each opening of the plurality of lipskin openings is elongated in a direction of an airflow over the lipskin.

* * * * *